(12) United States Patent
Yin et al.

(10) Patent No.: US 10,194,113 B2
(45) Date of Patent: Jan. 29, 2019

(54) SWITCHING CIRCUIT AND SWITCHING METHOD FOR VIDEO SIGNAL

(71) Applicant: Hangzhou Hikvision Digital Technology Co., Ltd., Zhejiang (CN)

(72) Inventors: Peng Yin, Zhejiang (CN); Huan Zhang, Zhejiang (CN); Qiufang Liang, Zhejiang (CN)

(73) Assignee: HANGZHOU HIKVISION DIGITAL TECHNOLOGY CO., LTD. (CN)

( * ) Notice: Subject to any disclaimer, the term of this patent is extended or adjusted under 35 U.S.C. 154(b) by 0 days.

(21) Appl. No.: 15/740,416

(22) PCT Filed: Dec. 11, 2015

(86) PCT No.: PCT/CN2015/097194
§ 371 (c)(1),
(2) Date: Dec. 28, 2017

(87) PCT Pub. No.: WO2017/000507
PCT Pub. Date: Jan. 5, 2017

(65) Prior Publication Data
US 2018/0191985 A1    Jul. 5, 2018

(30) Foreign Application Priority Data

Jun. 29, 2015  (CN) .......................... 2015 1 0378151

(51) Int. Cl.
*H04N 5/268*  (2006.01)
*H04N 5/44*  (2011.01)
*H04N 21/4147*  (2011.01)

(52) U.S. Cl.
CPC ........... *H04N 5/4403* (2013.01); *H04N 5/268* (2013.01); *H04N 5/44* (2013.01); *H04N 21/4147* (2013.01)

(58) Field of Classification Search
CPC ........ H04N 5/268; H04N 5/44; H04N 5/4403; H04N 21/4147

(Continued)

(56) References Cited

U.S. PATENT DOCUMENTS 7,571,491 B2 * 8/2009 Nakanishi ............... G06F 21/86
                                                        713/194
7,826,562 B2 * 11/2010 Nio ......................... H04N 5/445
                                                        348/553

(Continued)

FOREIGN PATENT DOCUMENTS

CN    101277403    10/2008
CN    104679464    6/2015

*Primary Examiner* — Trang U Tran
(74) *Attorney, Agent, or Firm* — Mark E. Bandy; Rankin, Hill & Clark LLP

(57) ABSTRACT

The present invention discloses a video signal switching circuit and switching method. The switching circuit includes: a regulating circuit connected to a first cable and configured to regulate the first cable to be in a pull-up state or a released state; a detection circuit connected to the first cable and configured to detect a first voltage value on the first cable when the first cable is in the pull-up state or detect a second voltage value on the first cable when the first cable is in the released state; and a controller configured to determine a change in the first voltage value or the second voltage value from the detection circuit, wherein the controller controls a second cable to transmit the video signal when determining that the second voltage value increases, or the controller controls the first cable to transmit the video signal when determining that the first voltage value decreases. The present invention solves the technical problem that the video signal cannot be switched adaptively due to the need of manually switching signal levels in the prior art.

1 Claim, 5 Drawing Sheets

(58) Field of Classification Search
USPC .............. 348/705, 706, 552, 554–558, 180
See application file for complete search history.

(56) References Cited

U.S. PATENT DOCUMENTS 9,071,769 B2 * 6/2015 Chen ..................... H04N 3/27
2011/0157372 A1 6/2011 Liu et al.

* cited by examiner

SWITCHING CIRCUIT AND SWITCHING METHOD FOR VIDEO SIGNAL

TECHNICAL FIELD

The present invention relates to the technical field of video surveillance, and in particular, to a video signal switching circuit and switching method.

BACKGROUND

In the prior art, there are mainly two ways for switching between a Transport Video Interface output signal (TVI) and a Composite Video Broadcast Signal or Composite Video Blanking and Sync (CVBS), one is a switching method with a dial switch inside a camera, the other is a cable overlapping of camera outgoing lines.

In the first switching method with a dial switch, the output switching between the TVI and CVBS is performed by a dial switch, the dial switch is generally arranged on a PCB (printed circuit board) inside the camera, and when the output is required to be switched, the corresponding BNC cable is connected to a digital video recorder (DVR), then the machine shell is opened, and the dial switch is shifted to a corresponding position, so that switching is realized; the disadvantages of the method are that the operation of opening the machine shell is relatively troublesome, and the size of the dial switch is relatively large, which occupies a relatively large PCB space. Furthermore, there is certain interference on the structure, which is not beneficial to user operation. FIG. 1 is a schematic diagram of a video signal switching method in the prior art. As shown in FIG. 1, the switching is realized manually by a dial switch installed in a camera. In FIG. 1, the first cable is a cable for transmitting a composite video broadcast signal CVBS, and the second cable is a cable for transmitting a transport video interface output signal TVI.

In the second switching method with cable overlapping, the output switching between the TVI and CVBS is realized by two control lines led out by an overlapping machine, wherein one signal is output by default, and the other signal is output when the cable is overlapped. The disadvantages of the method are that the led and exposed cable is easy to bring static electricity and other problems, and the twisted cable may cause mechanical fatigue and be also easily affected by external forces to cause loose contact, affecting the use of the machine. FIG. 2 is a schematic diagram of another video signal switching method in the prior art. As shown in FIG. 2, two overlapping wire 1 and wire 2 are led out at one side of the camera, and the overlapping wires are connected to the DVR through selection, and then the TVI and the CVBS signal lines are overlapped on the DVR to realize signal switching. In FIG. 2, the first cable is a cable for transmitting a composite video broadcast signal CVBS, and the second cable is a cable for transmitting a transport video interface output signal TVI.

For the above problems, no effective solution has been proposed yet.

SUMMARY

An embodiment of the present invention provides a video signal switching circuit and switching method to at least solve the technical problem that the video signal cannot be switched adaptively due to the need of manually switching signal levels in the prior art.

According to an aspect of the embodiments of the present invention, there is provided a video signal switching circuit. The switching circuit includes: a regulating circuit connected to a first cable which is a cable for transmitting a composite video broadcast signal, and configured to regulate the first cable to be in a pull-up state or a released state; a detection circuit connected to the first cable, and configured to detect a first voltage value on the first cable when the first cable is in the pull-up state or detect a second voltage value on the first cable when the first cable is in the released state; and a controller configured to determine a change in the first voltage value or the second voltage value from the detection circuit, wherein the controller controls a second cable, which is a cable for transmitting a transport video interface output signal, to transmit a video signal when determining that the second voltage value increases, or the controller controls the first cable to transmit a video signal when determining that the first voltage value decreases.

Further, the regulating circuit includes: a first resistor, wherein a first end of the first resistor is connected to a high level; a second resistor, wherein a first end of the second resistor is connected to an output end of a first input signal which is a pin output signal of the controller, and a second end of the second resistor is connected to a second end of the first resistor; a triode, wherein a base of the triode is connected to the second end of the first resistor, and a collector of the triode is connected to the high level; a third resistor, wherein a first end of the third resistor is connected to an input end of the first cable, and a second end of the third resistor is connected to an emitter of the triode; and a first capacitor, wherein a first end of the first capacitor is connected to the second end of the first resistor, and a second end of the first capacitor is connected to ground.

Further, the switching circuit further includes: a filtering circuit, connected to both the regulating circuit and the detection circuit, and configured to filter the second voltage value when the first cable is controlled to transmit the video signal, wherein the detection circuit samples the filtered second voltage value.

Further, the filter circuit includes: a fourth resistor, wherein a first end of the fourth resistor is connected to an input end of the first cable; and a second capacitor, wherein a first end of the second capacitor is connected to a second end of the fourth resistor, and a second end of the second capacitor is connected to ground.

Further, the switching circuit further includes: an AD sampling port of the controller, wherein the AD sampling port is connected to the second end of the fourth resistor.

Further, the switching circuit further includes: a serial port configuration circuit, connected to the controller through an asynchronous receiver transmitter, wherein the controller controls the first cable to transmit the video signal or the second cable to transmit the video signal via the serial port configuration circuit.

Further, the switching circuit further includes: a fifth resistor, wherein a first end of the fifth resistor is connected to an input end of the first cable, and a second end of the fifth resistor is connected to ground.

According to another aspect of the embodiments of the present invention, there is provided a video signal switching method. The method includes: regulating a first cable to be in a pull-up state or a released state, wherein the first cable is a cable for transmitting a composite video broadcast signal; detecting a first voltage value on the first cable when the first cable is in the pull-up state, or detecting a second voltage value on the first cable when the first cable is in the released state; determining a change in the first voltage value or the second voltage value; transmitting a video signal via the first cable when it is determined that the first voltage value decreases; and transmitting the video signal by a second cable when it is determined that the second voltage value increases, wherein the second cable is a cable for transmitting a transport video interface output signal.

Further, after transmitting a video signal via the first cable when it is determined that the first voltage value decreases, the method further includes: filtering the second voltage value.

Further, after transmitting a video signal via the first cable when it is determined that the first voltage value decreases, the method further includes: regulating the first cable to be in the released state.

Further, the first cable is regulated to be in the pull-up state by controlling the output of a first input signal to be a low level, wherein the first input signal is a pin output signal of the controller, and the first cable is regulated to be in the released state by controlling the output of the first input signal to be a high level.

In the embodiments of the present invention, a regulating circuit, a detection circuit and a controller are adopted. The regulating circuit is connected to a first cable, and configured to regulate the first cable to be in a pull-up state or a released state, wherein the first cable is a cable for transmitting a composite video broadcast signal. The detection circuit is connected to the first cable and configured to detect a first voltage value on the first cable when the first cable is in the pull-up state or detect a second voltage value on the first cable when the first cable is in the released state. The controller is configured to determine a change in the first voltage value or the second voltage value from the detection circuit, wherein the controller controls a second cable, which is a cable for transmitting a transport video interface output signal, to transmit the video signal when determining that the second voltage value increases, or the controller controls the first cable to transmit the video signal when determining that the first voltage value decreases. The regulating circuit is adopted to regulate the first cable to be in a pull-up state or a released state, wherein the regulating circuit is connected to the first cable. When the first cable is in the pull-up state, a first voltage value on the first cable is detected, and it is determined whether the first voltage value decreases. If the first voltage value is unchanged, the second cable is controlled to transmit the video signal, and at the same time, the regulating circuit regulates the first cable to be in the released state. When the first cable is in the released state, the second voltage value on the first cable is detected. When it is detected that the second voltage value increases, the controller controls the second cable to transmit the video signal, and at the same time, the regulating circuit regulates the first cable to be in the pull-up state. If the second voltage value is unchanged, the first cable continues to transmit the video signal. Furthermore, the detection circuit is also connected to the first cable. The embodiments of the present application achieves the purpose of switching the video signal without manually switching the signal level, and realizes the technical effect of adaptively switching the video signal, thereby solving the problem that the video signal cannot be switched adaptively due to the need of manually switching signal levels in the prior art.

BRIEF DESCRIPTION OF THE DRAWINGS

The drawings described herein are used to provide a further understanding of the present invention and constitute a part of the present application. The exemplary embodiments of the present invention and the descriptions thereof are used to explain the present invention, and do not constitute improper limitations to the present invention. In the drawings.

DETAILED DESCRIPTION

In order to make those skilled in the art to better understand the solutions of the present invention, the technical solutions in the embodiments of the present invention are clearly and completely described with reference to the accompanying drawings for the embodiments of the present invention. Apparently, the described embodiments are merely a part of embodiments of the present invention, rather than all the embodiments. Based on the embodiments of the present application, all other embodiments obtained by those of ordinary skill in the art without making creative work shall fall within the scope of present application.

It should be noted that the terms "first", "second" and the like in the description and claims of the present invention as well as the above drawings are used to distinguish similar objects, and are not necessarily used to describe a specific order or sequence. It should be understood that the data used in this way can be interchanged in appropriate circumstances, so that the embodiments of the present invention described herein can be implemented in a sequence other than those illustrated or described herein. Moreover, the terms "include", "comprise" or any variants thereof are intended to cover a non-exclusive inclusion, for example, a process, method, system, product, or device that incorporates a series of steps or elements need not be limited to those steps or elements explicitly listed, but may include other steps or elements not expressly listed or inherent to these processes, methods, products or devices.

First, the technical terms involved in the embodiments are explained as follows:

HD-TVI (High Definition-Transport Video Interface) is a high-definition transport video standard based on coaxial cables, which herein refers to a high-definition transport video interface output signal.

CVBS (Composite Video Broadcast Signal or Composite Video Blanking and Sync) is a composite video broadcast signal that includes a brightness signal, a chrominance signal and a synchronous signal (including field a synchronization signal, a line synchronization signal and a line field blanking signal).

"Adaptive" refers to that during the processing and analyzing process, the processing method is automatically adjusted according to the characteristics of the processed data, so that it can be adapted to external requirements.

BNC (Bayonet Nut Connector) Cable is a coaxial cable with a connector.

UART (Universal Asynchronous Receiver Transmitter) is an asynchronous receiver transmitter.

BT.1120 is a digital high definition video data format protocol, which herein represents digital data signals.

TX herein represents a TVI interface chip.

Pull-up is to clamp an uncertain signal at a high level via a resistor, the resistor being used for current limiting at the same time.

According to embodiments of the present invention, there is provided an embodiment of video signal switching circuit.

Figure 1:
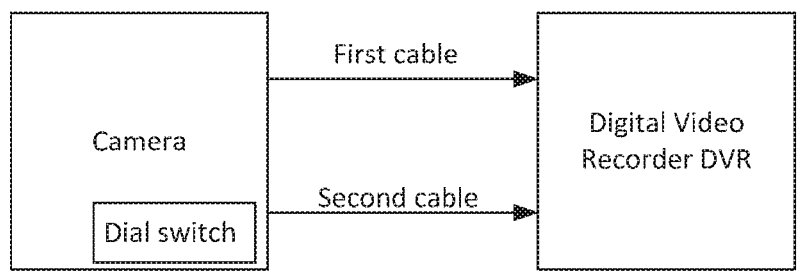
FIG. 1 is a schematic diagram of a video signal switching method according to the prior art.
Figure 2:
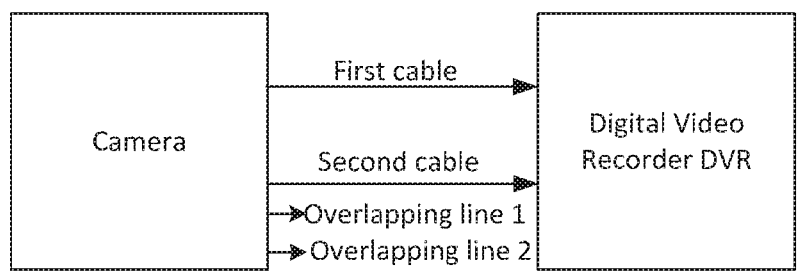
FIG. 2 is a schematic diagram of another video signal switching method according to the prior art.
Figure 3:
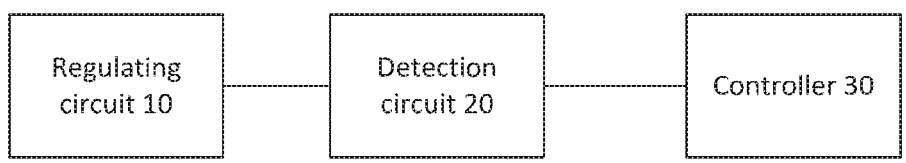
FIG. 3 is a schematic diagram of an alternative video signal switching circuit according to an embodiment of the present invention.

FIG. 3 is a schematic diagram of an alternative video signal switching circuit according to an embodiment of the present invention. As shown in FIG. 3, the video signal switching circuit includes a regulating circuit 10, a detection circuit 20 and a controller 30. The regulating circuit 10 is connected to a first cable, and configured to regulate the first cable to be in a pull-up state or a released state. The first cable is a cable for transmitting a composite video broadcast signal. The detection circuit 20 is connected to the first cable, and configured to detect a first voltage value on the first cable when the first cable is in the pull-up state or detect a second voltage value on the first cable when the first cable is in the released state. The controller 30 is configured to determine a change in the first voltage value or the second voltage value from the detection circuit 20. The controller controls the second cable to transmit the video signal when determining that the second voltage value increases, or the controller controls the first cable to transmit the video signal when determining that the first voltage value decreases. The second cable is a cable for transmitting a transport video interface output signal.

In the video signal switching circuit provided in the embodiment of the present invention, the first cable is regulated to be in the pull-up state or the released state by the regulating circuit, wherein the regulating circuit is connected to the first cable. When the first cable is in the pull-up state, the first voltage value on the first cable is detected, and it is determined whether the detected first voltage value decreases. If the first voltage value is unchanged, the second cable is controlled to transmit a video signal, and at the same time, the regulating circuit regulates the first cable to be in the released state. When the first cable is in the released state, the second voltage value on the first cable is detected. When it is detected that the second voltage value increases, the controller controls the second cable to transmit the video signal, and at the same time, the regulating circuit regulates the first cable to be in the pull-up state. If the second voltage value is unchanged, the first cable is controlled to transmit the video signal. In the video signal switching circuit, the detection circuit is also connected to the first cable. Accordingly, the video signal switching circuit achieves the purpose of switching the video signal without manually switching the signal level, and thus realizes the technical effect of adaptively switching the video signal, thereby solving the problem that the video signal cannot be switched adaptively due to the need of manually switching signal levels in the prior art.

Figure 4:
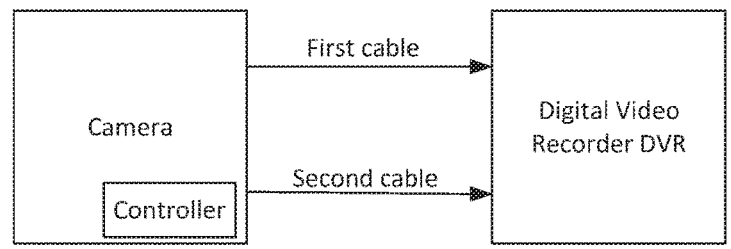
FIG. 4 is a schematic diagram of another alternative video signal switching circuit according to an embodiment of the present invention.

FIG. 4 is a schematic diagram of another alternative video signal switching circuit according to an embodiment of the present invention. As shown in FIG. 4, the camera establishes a connection with the DVR (Digital Video Recorder) through the first cable and the second cable, the first cable may be a cable for transmitting a composite video broadcast signal CVBS, and the second cable may be a cable for transmitting a transport video interface output signal TVI. A connection status between the first cable and the DVR is controlled. When the connection status is changed, the voltage value on the first cable will change. A "controller" shown in FIG. 4 analyzes a sampled voltage value, and controls the first cable to output the composite video broadcast signal CVBS or controls the second cable to output the transport video interface output signal TVI according to the variation of the voltage value. In the case that the first cable is not connected to the DVR, the controller controls the second cable to output the transport video interface output signal TVI by default.

Figure 5:
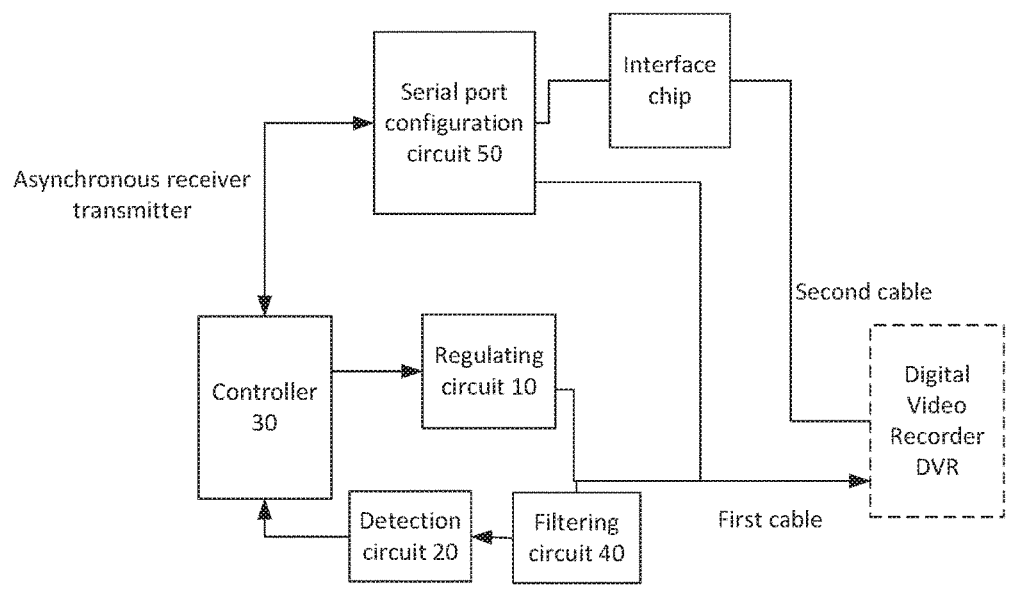
FIG. 5 is a schematic diagram of another alternative video signal switching circuit according to an embodiment of the present invention.

FIG. 5 is a schematic diagram of another alternative video signal switching circuit according to an embodiment of the present invention. As shown in FIG. 5, the video signal switching circuit further includes: a filtering circuit 40 and a serial port configuration circuit 50. As shown in FIG. 5, in addition to the above devices, the video signal switching circuit further includes: a universal asynchronous receiver transmitter (UART); an interface chip for outputting a transport video interface output signal TVI; a digital video recorder (DVR). The filtering circuit 40 is connected to both the regulating circuit 10 and the detection circuit 20, and configured to filter the second voltage value when the first cable is controlled to transmit a video signal. The detection circuit 20 samples the filtered second voltage value. The serial port configuration circuit 50 is connected to the controller 30 through the UART, wherein the controller 30 controls the first cable to transmit the video signal or controls the second cable to transmit the video signal by the serial port configuration circuit 50.

Specifically, the implementation of the video signal switching circuit mainly includes five modules, i.e., the regulating circuit 10, the detection circuit 20, the controller 30, the filtering circuit 40 and the serial port configuration circuit 50. First, the first cable is controlled by the regulating circuit 10 to be in a pull-up state, that is, the first cable is pulled up to 3.3V. If it is detected that the first voltage value on the first cable is unchanged, it can be determined that the second cable keeps the connection with the DVR, and the second cable continues to transmit the video signal. If it is detected that the first voltage value on the first cable decreases, it can be determined that the first cable is connected to the DVR in FIG. 5, which is equivalent to that the first cable is connected to a load. The controller 30 configures the serial port configuration circuit 50 via the UART to directly transmit the composite video broadcast signal CVBS via the first cable, and at the same time, the first cable is regulated to be in a released state by using the regulating circuit 10. Then, the change in the voltage value on the first cable continues to be detected, and at this time, the detected voltage value is the second voltage value. If it is detected that the second voltage value on the first cable is unchanged, it can be determined that the first cable keeps the connection with the DVR, and the first cable continues to transmit the video signal. If it is detected that the second voltage value on the first cable increases, it can be determined that the first cable is disconnected from the DVR in FIG. 5, at this time, the first cable is not connected to the load. The controller 30 configures the serial port configuration circuit 50 via the UART to output the digital data signal BT.1120 to the interface chip as shown in FIG. 5, the interface chip transmits the transport video interface output signal TVI via the second cable, and at the same time, the regulating circuit regulates the first cable to be in a pull-up state. BT.1120 is a digital high definition video data format protocol, which herein represents the digital data signal.

When the controller 30 controls the serial port configuration circuit 50 to directly transmit the composite video broadcast signal CVBS via the first cable, since the signal on the first cable is a high-frequency signal, the controller 30 detects a large fluctuation of the sampling voltage value. In order to avoid interference, the filtering circuit 40 is added. The composite video broadcast signal CVBS is filtered by the filter circuit 40 and then sent to the controller 30 for detection. The regulating circuit 10 regulates the first cable to be in a pull-up state or a released state.

Figure 6:
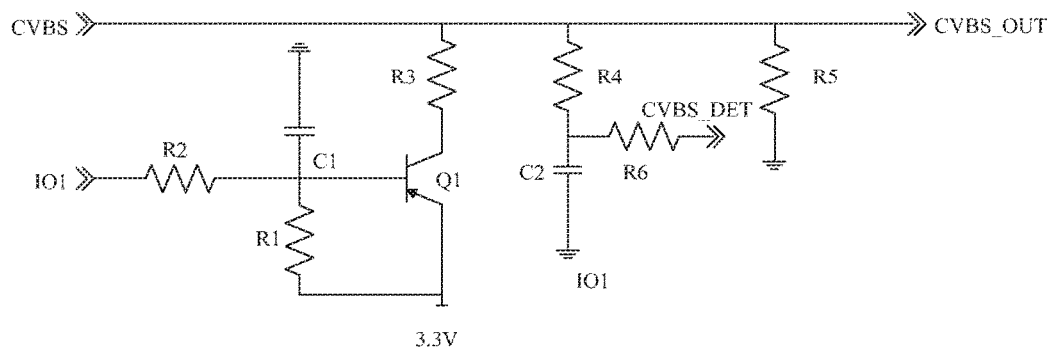
FIG. 6 is a schematic diagram of another alternative video signal switching circuit according to an embodiment of the present invention.

FIG. 6 is a schematic diagram of another alternative video signal switching circuit according to an embodiment of the present invention. As shown in FIG. 6, the regulating circuit 10 includes a first resistor R1, a second resistor R2, a triode Q1, a third resistor R3 and a first capacitor C1. A first end of the first resistor R1 is connected to a high level. A first end of the second resistor R2 is connected to an output end of a first input signal, and a second end of the second resistor R2 is connected to a second end of the first resistor R1, wherein the first input signal is a pin output signal of the controller. The base of the triode Q1 is connected to the second end of the first resistor R1, and the collector of the triode Q1 is connected to a high level. A first end of the third resistor R3 is connected to an input end of the first cable, and a second end of the third resistor R3 is connected to the emitter of the triode Q1. A first end of the first capacitor C1 is connected to the second end of the first resistor R1, and a second end of the first capacitor C1 is connected to ground.

As shown in FIG. 6, the filtering circuit 40 includes: a fourth resistor R4 and a second capacitor C2. A first end of the fourth resistor R4 is connected to the input end of the first cable. A first end of the second capacitor C2 is connected to a second end of the fourth resistor R4, and the second end of the second capacitor C2 is connected to ground.

The switching circuit further includes: an AD sampling port of the controller 30, which is connected to the second end of the fourth resistor R4; a fifth resistor R5, wherein a first end of the fifth resistor R5 is connected to an input end of the first cable, and a second end of the fifth resistor R5 is connected to grounding end.

Specifically, a "CVBS" signal shown in FIG. 6 is a signal output by the serial port configuration circuit 50, a "CVBS_OUT" is a signal output by the first cable interface, a "CVBS_DET" is the AD sampling port of the controller 30, an IO1 signal is a first input signal, that is, a pin output signal of the controller 30.

When controlling the pin output signal IO1 to be a low level, the controller 30 controls the triode Q1 in the regulating circuit 10 to be conducted. When controlling the pin output signal IO1 to be a high level, the controller 30 controls the triode Q1 in the regulating circuit 10 to be cut off. When a composite video broadcast signal CVBS is output by the first cable, since the composite video broadcast signal CVBS contains a high frequency signal, the filtering circuit 40 formed by the fourth resistor R4 and the second capacitor C2 as shown in FIG. 6 filters the composite video broadcast signal CVBS to eliminate the interference caused by the high-frequency signal during subsequent video switching. The AD sampling port of the controller 30 samples the composite video broadcast signal CVBS processed by the filtering circuit 40, and transmits the sampled data to the controller 30 for a further determination. The resistance of the first resistor R1 in FIG. 6 can be selected as 100 KΩ, the resistance of the second resistor R2 can be selected as 1 KΩ, the resistance of the fourth resistor R4 can be selected as 22 KΩ, the value of the first capacitor C1 can be selected as 10 nF, and the value of the second capacitor can be selected as 1 uF.

Figure 7:
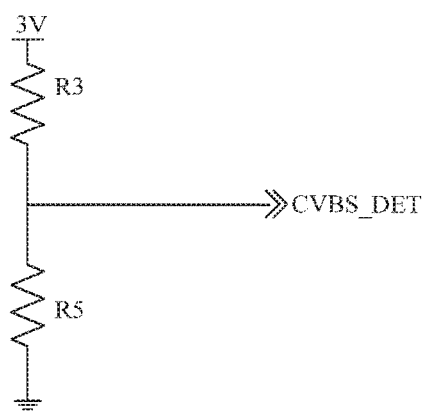
FIG. 7 is a schematic diagram of an equivalent circuit for controlling a first cable to transmit a video signal under the condition that a video signal switching circuit according to an embodiment of the present invention is not connected to a load.

FIG. 7 is a schematic diagram of an equivalent circuit for controlling a first cable to transmit a video signal under the condition that a video signal switching circuit according to an embodiment of the present invention is not connected to a load. When the first cable has not been connected to the DVR, i.e., not connected to the load, no composite video broadcast signal CVBS is output by the first cable. The controller 30 controls the output of the first input signal IO1 to be a low level, so that the first cable is in the pull-up state, and the triode Q1 is turned on. At this time, the triode Q1, the third resistor R3 and the fifth resistor R5 form a voltage dividing circuit. A voltage of 3.3 V is reduced to be about 3.0 V after passing through the Q1, and the resulting voltage is divided by R3 and R5, so that the voltage of the AD sampling port CVBS_DET of the controller 30 is reduced to be about 1.6 V. At this time, the first cable is not connected to the DVR. Therefore, the controller 30 controls the serial port configuration circuit 50 to output the transport video interface output signal TVI, so that no composite video broadcast signal CVBS is outputted by the first cable. Thus, the filtering circuit 40 is not started.

Figure 8:
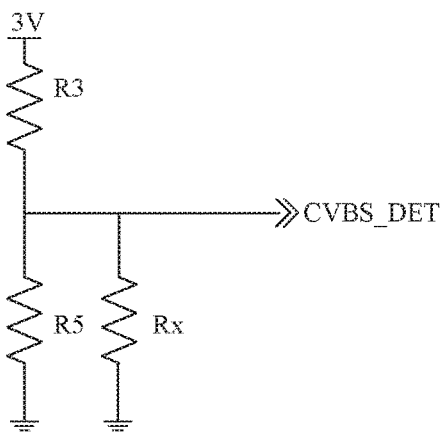
FIG. 8 is a schematic diagram of an equivalent circuit for controlling a first cable to transmit a video signal under the condition that a video signal switching circuit according to an embodiment of the present invention is connected to a load.

FIG. 8 is a schematic diagram of an equivalent circuit for controlling a first cable to transmit a video signal under the condition that a video signal switching circuit according to an embodiment of the present invention is connected to a load. The controller 30 controls the first input signal IO1 pin to output a low level, so that the triode Q1 is turned on. At this time, the triode Q1, the third resistor R3 and the fifth resistor R5 form a voltage dividing circuit. When the first cable is connected to the DVR, that is, when the first cable interface output signal CVBS_OUT is connected to the load Rx whose resistance can be selected to be 75Ω, the circuit is simplified to be shown in FIG. 8, and the voltage value of the AD sampling port CVBS_DET of the controller 30 is reduced to be about 1.0 V, that is, the first voltage value is reduced to be about 1.0 V. Therefore, when the first voltage value is reduced from 1.6 V to about 1.0 V, the controller 30 determines that the first cable interface output signal CVBS_OUT is connected to the load, controls the serial port configuration circuit 50 to output a composite video broadcast signal CVBS, and controls the first input signal IO1 pin to output a high level, so that the triode Q1 is in a cut-off state.

Figure 9:
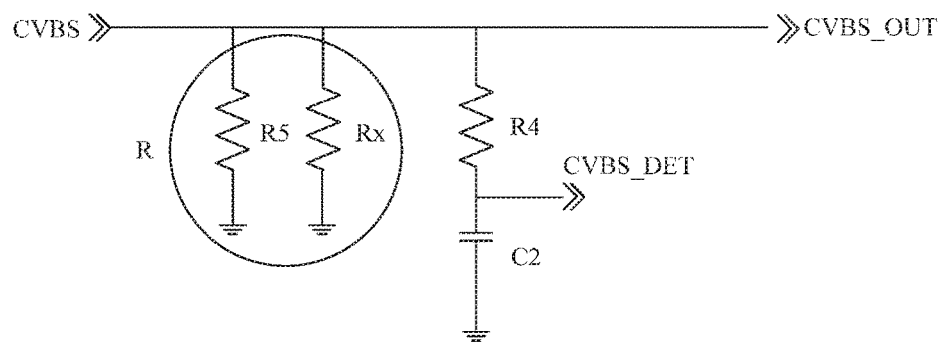
FIG. 9 is a schematic diagram of an equivalent circuit for controlling a second cable to transmit a video signal under the condition that a video signal switching circuit according to an embodiment of the present invention is connected to a load.

FIG. 9 is a schematic diagram of an equivalent circuit for controlling a second cable to transmit a video signal under the condition that a video signal switching circuit according to an embodiment of the present invention is connected to a load. As shown in FIG. 9, when the first cable interface output signal CVBS_OUT is connected to the load Rx, the controller 30 controls the serial port configuration circuit 50 to output a composite video broadcast signal, i.e., a signal is input at the "CVBS" end in FIG. 9. At this time, the circuit is simplified as shown in FIG. 9. The fifth resistor R5 and the load Rx are connected in parallel to obtain a parallel equivalent resistor R, wherein the resistance value of the parallel equivalent resistor R is 39Ω. The fourth resistor R4 and the second capacitor C2 constitute a filtering circuit 40, and the voltage value of the AD sampling port CVBS_DET of the controller 30 after being filtered by the filtering circuit 40 is a direct current level, wherein the filtering circuit 40 is a low-pass filter.

Figure 10:
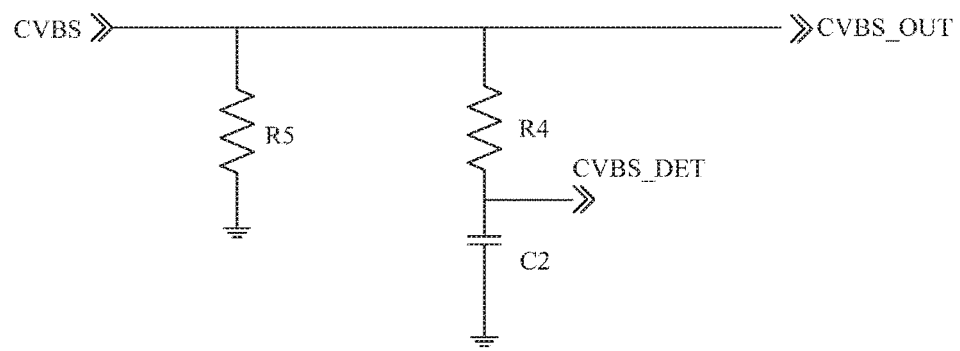
FIG. 10 is a schematic diagram of an equivalent circuit for controlling a second cable to transmit a video signal under the condition that a video signal switching circuit according to an embodiment of the present invention is not connected to a load.

FIG. 10 is a schematic diagram of an equivalent circuit for controlling a second cable to transmit a video signal under the condition that a video signal switching circuit according to an embodiment of the present invention is not connected to a load. When the first cable interface output signal CVBS_OUT is disconnected from the load Rx, the circuit is simplified as shown in FIG. 10. The signal voltage value of the AD sampling port CVBS_DET of the controller 30 is increased from the original value 0.615 V-0.68 V to twice the original value, i.e., 1.23 V-1.36 V, that is, the second voltage value is increased from the original value 0.615 V-0.68 V to twice the original value, i.e., 1.23 V-1.36 V. At this time, the controller 30 determines that the second cable outputs a transport video interface output signal TVI, outputs a TVI signal via the serial port configuration circuit 50, and controls the first input signal IO1 pin to output a low level, so that the triode Q1 is in a conducted state.

An embodiment of the present invention further provides a video signal switching method, which may be applied to a video signal switching circuit in the embodiments of the present invention. It should be noted that although the switching method in the embodiment of the present invention shows a logical sequence in the flowchart, in some cases, the steps shown or described may be performed in an order different from that in the flowchart.

Figure 11:
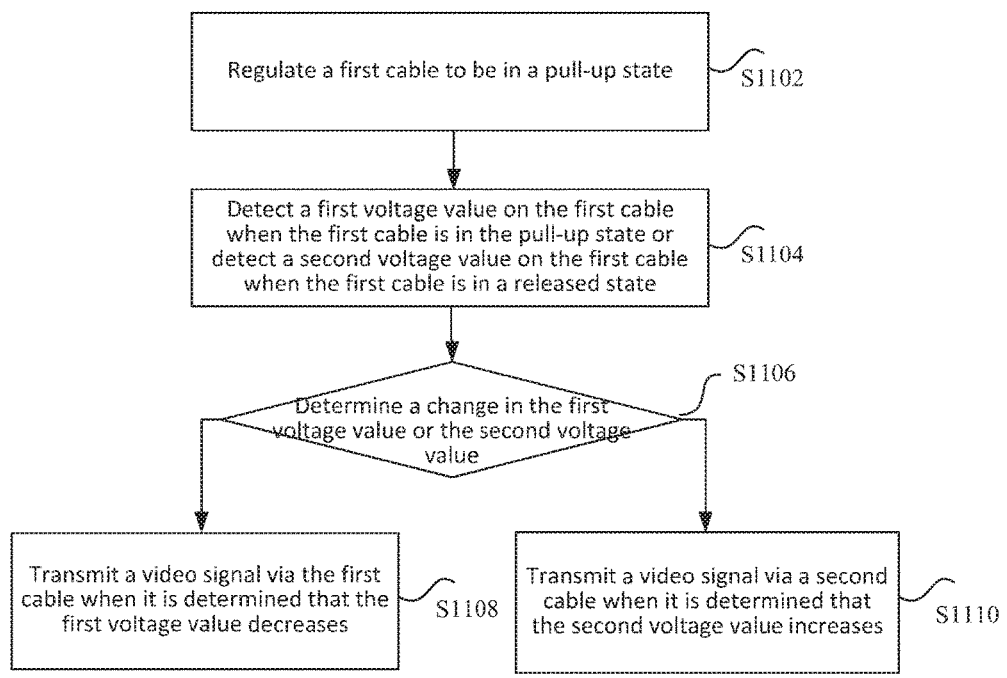
FIG. 11 is a flowchart of an alternative video signal switching method according to an embodiment of the present invention.

FIG. 11 is a flowchart of an alternative video signal switching method according to an embodiment of the present invention. As shown in FIG. 11, the method includes S1102 to S1110.

S1102. Regulate a first cable to be in a pull-up state, wherein the first cable is a cable for transmitting a composite video broadcast signal.

S1104. Detect a first voltage value on the first cable when the first cable is in the pull-up state or detect a second voltage value on the first cable when the first cable is in the released state.

S1106. Determine a change in the first voltage value or the second voltage value.

S1108. Transmit a video signal via the first cable when it is determined that the first voltage value decreases.

S1110. Transmit the video signal via a second cable when it is determined that the second voltage value increases, wherein the second cable is a cable for transmitting a transport video interface output signal. Specifically, when it is determined that the voltage value increases, which indicates that the first cable is not connected to the load, the video signal is transmitted by the second cable.

In the video signal switching method provided in an embodiment of the present invention, the first cable is regulated by the regulating circuit to be in a pull-up state or a released state, wherein the regulating circuit is connected to the first cable. When the first cable is in the pull-up state, a first voltage value on the first cable is detected and it is determined whether the first voltage value decreases. If the first voltage value is unchanged, the second cable continues to transmit the video signal, and at the same time, the regulating circuit regulates the first cable to be in the released state. When the first cable is in the released state, a second voltage value on the first cable is detected. When it is detected that the second voltage value increases, the controller controls the second cable to transmit the video signal, and at the same time, the regulating circuit regulates the first cable to be in the pull-up state. If the second voltage is unchanged, the first cable continues to transmit the video signal. Further, the detection circuit is also connected to the first cable. The video signal switching method achieves the purpose of switching the video signal without manually switching the signal level, and realizes the technical effect of adaptively switching the video signal, thereby solving the problem that the video signal cannot be switched adaptively due to the need of manually switching the signal level in the prior art.

Further, when it is determined that the first voltage value on the first cable decreases, the first cable is controlled to transmit the composite video broadcast signal CVBS. Since the signal of the first cable is a high-frequency signal, when the composite video broadcast signal CVBS is output, the detected sample voltage value fluctuates greatly. In order to avoid interference, a filter circuit is added to filter the second voltage value, so that the composite video broadcast signal CVBS is filtered for detection.

Further, after the composite video broadcast signal CVBS is transmitted via the first cable, it is necessary to regulate the first cable to be in a released state by controlling the output of the first input signal. The first cable is regulated to be in a pull-up state mainly by controlling the output of the first input signal to be a low level. The first cable is regulated to be in a released state by controlling the output of the first input signal to be a high level. The first input signal is a pin output signal of the controller.

The sequence numbers of the foregoing embodiments of the present invention are merely for the purpose of description and do not represent the advantages and disadvantages of the embodiments.

In the above embodiments of the present invention, the description of each embodiment has its own emphasis. For the parts that are not described in detail in one embodiment, reference may be made to the related descriptions in other embodiments.

In the several embodiments provided in the present application, it should be understood that the disclosed technical content may be implemented in other manners. The device embodiments described above are merely exemplary. For example, the unit division may be a logical function division and may be other division in actual implementation. For example, a plurality of units or components may be combined or may be integrated into another system, or some of the features may be ignored or not performed. In addition, the shown or discussed mutual coupling or direct coupling or communication connection may be indirect coupling or communication connection through some interfaces, units or modules, and may be electrical or other forms.

The description above is only the preferred embodiments of the present invention, and it should be noted that those skilled in the art may make various improvements and modifications without departing from the principle of the present invention, these improvements and modifications should also be regarded as the protection scope of the present invention.

What is claimed is:

1. A video signal switching circuit, comprising:
    a regulating circuit connected to a first cable which is a cable for transmitting a composite video broadcast signal, and configured to regulate the first cable to be in a pull-up state in which the first cable is clamped to a high level via a resistor or a released state in which the first cable is released from being clamped to the high level;
    a detection circuit connected to the first cable; and configured to detect a first voltage value on the first cable when the first cable is in the pull-up state or detect a second voltage value on the first cable when the first cable is in the released state; and
    a controller configured to control a second cable to transmit a high-definition transport video interface output signal when determining that the second voltage value increases, or control the first cable to transmit a composite video broadcast signal when determining that the first voltage value decreases, wherein the regulating circuit comprises:
    a first resistor, wherein a first end of the first resistor is connected to a high voltage source;
    a second resistor, wherein a first end of the second resistor is connected to an output end of a first input signal which is a pin output signal of the controller, and a second end of the second resistor is connected to a second end of the first resistor;
    a triode, wherein a base of the triode is connected to the second end of the first resistor, and a collector of the triode is connected to the high voltage source;
    a third resistor, wherein a first end of the third resistor is connected to an input end of the first cable, and a second end of the third resistor is connected to an emitter of the triode; and
    a first capacitor, wherein a first end of the first capacitor is connected to the second end of the first resistor, and a second end of the first capacitor is connected to ground.

* * * * *